(12) United States Patent
Chao

(10) Patent No.: US 6,199,981 B1
(45) Date of Patent: Mar. 13, 2001

(54) METHOD FOR SECURING SPECTACLE MEMBERS TOGETHER

(76) Inventor: David Yinkai Chao, 1120 Green Acre Rd., Towson, MD (US) 21204

( * ) Notice: Subject to any disclaimer, the term of this patent is extended or adjusted under 35 U.S.C. 154(b) by 0 days.

(21) Appl. No.: 09/492,892

(22) Filed: Jan. 27, 2000

(51) Int. Cl.⁷ ..................................................... G02C 1/02
(52) U.S. Cl. ........................... 351/110; 351/140; 351/178
(58) Field of Search .................... 351/110, 121, 351/133, 135, 140, 143, 144, 149, 178

(56) References Cited

U.S. PATENT DOCUMENTS

| | | | |
|---|---|---|---|
| 1,931,177 | * 10/1933 | Braucht | 351/110 |
| 2,004,005 | * 6/1935 | McDanal | 351/110 |
| 5,835,183 | * 11/1998 | Murai et al. | 351/110 |
| 6,024,445 | * 2/2000 | Conner et al. | 351/110 |

* cited by examiner

*Primary Examiner*—Huy Mai
(74) *Attorney, Agent, or Firm*—Charles E. Baxley

(57) ABSTRACT

A method for securing two or more spectacle members together includes forming an orifice and an opening in one of the spectacle members, the opening of the spectacle frame may have an open or enclosed structure, forming an extension and a projection on the other spectacle member and engaging the extension and the projection into the orifice and the opening of the spectacle member. The extension or the projection is then melted or deformed to engage with the other spectacle member and to secure the spectacle members together. The spectacle members may be the lenses, the bridge or the temples. The spectacle members may be easily and quickly secured together without fasteners.

3 Claims, 4 Drawing Sheets

METHOD FOR SECURING SPECTACLE MEMBERS TOGETHER

BACKGROUND OF THE INVENTION

1. Field of the Invention

The present invention relates to a method, and more particularly to a method for securing spectacle members, such as the legs or temples and the lenses, and/or the bridge and the lenses, together.

2. Description of the Prior Art

Typical spectacle frames, particularly the rimless spectacle frames, comprise a pair of lenses, a bridge secured between the lenses, and a pair of legs or temples secured to the sides of the lenses respectively. The spectacle members, including the lenses and the temples and/or the bridge, are normally secured together with adhesive materials and/or fasteners, and may not be solidly secured together. In addition, it takes a long time to apply the adhesive materials onto the spectacle members and/or to securing the fasteners.

The present invention has arisen to mitigate and/or obviate the afore-described disadvantages of the conventional spectacle frames.

SUMMARY OF THE INVENTION

The primary objective of the present invention is to provide a method for solidly securing the spectacle members, including the lenses and the temples and/or the bridge, together without fasteners.

In accordance with one aspect of the invention, there is provided a method for securing a first spectacle member and a second spectacle member together, the method comprises forming an orifice and an opening in the first spectacle member, the opening of the first spectacle frame including an open or enclosed structure, forming an extension and a projection on the second spectacle member, engaging the extension and the projection of the second spectacle member into the orifice and the opening of the first spectacle member, and deforming the extension to engage with the first spectacle member and to secure the first and the second spectacle members together. The first spectacle member is the lenses, and the second spectacle member may be the bridge or the temples. The spectacle members may be easily and quickly secured together without fasteners.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
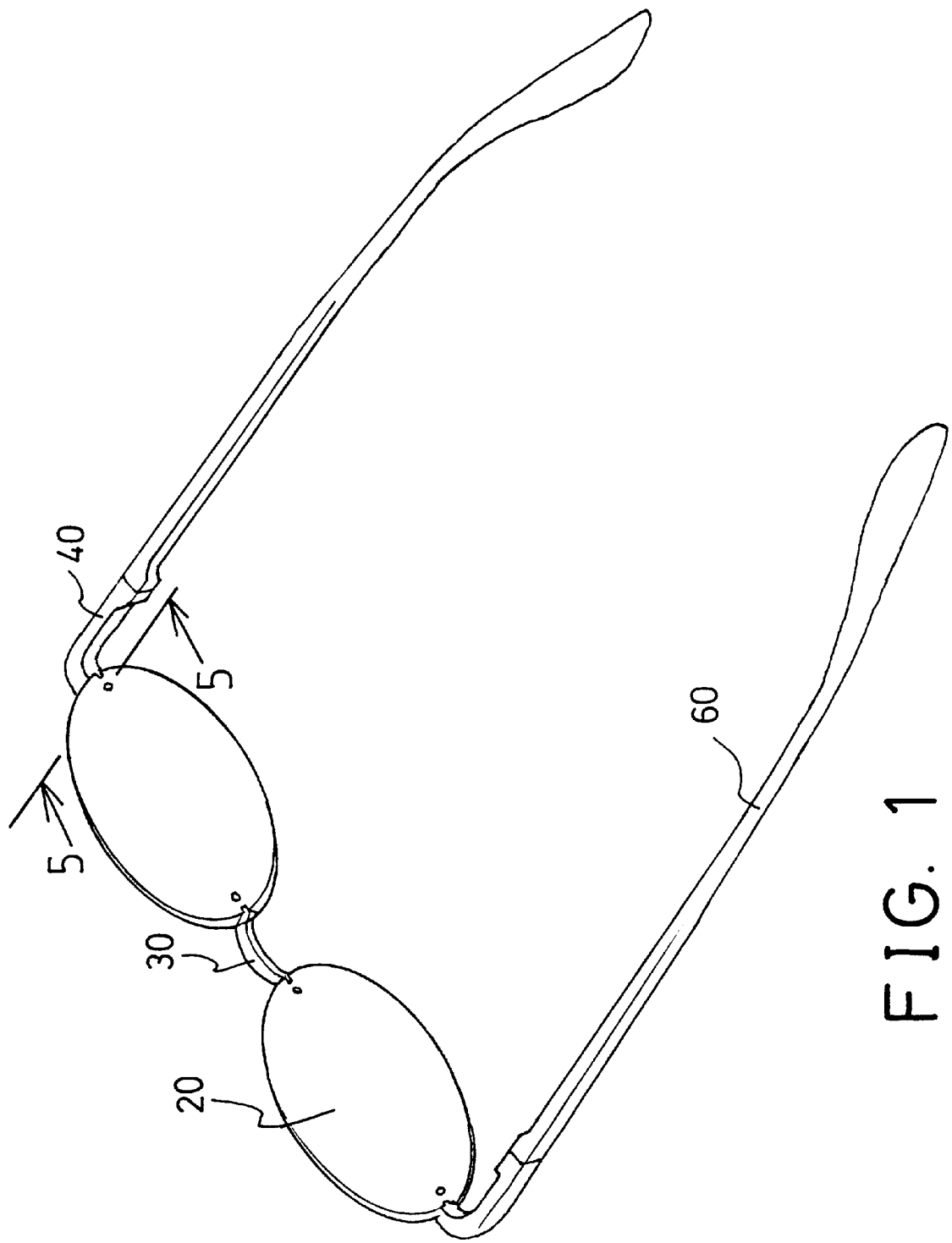
FIG. 1 is a perspective view illustrating a spectacle frame having spectacle members to be secured together with a method in accordance with the present invention.
Figure 2:
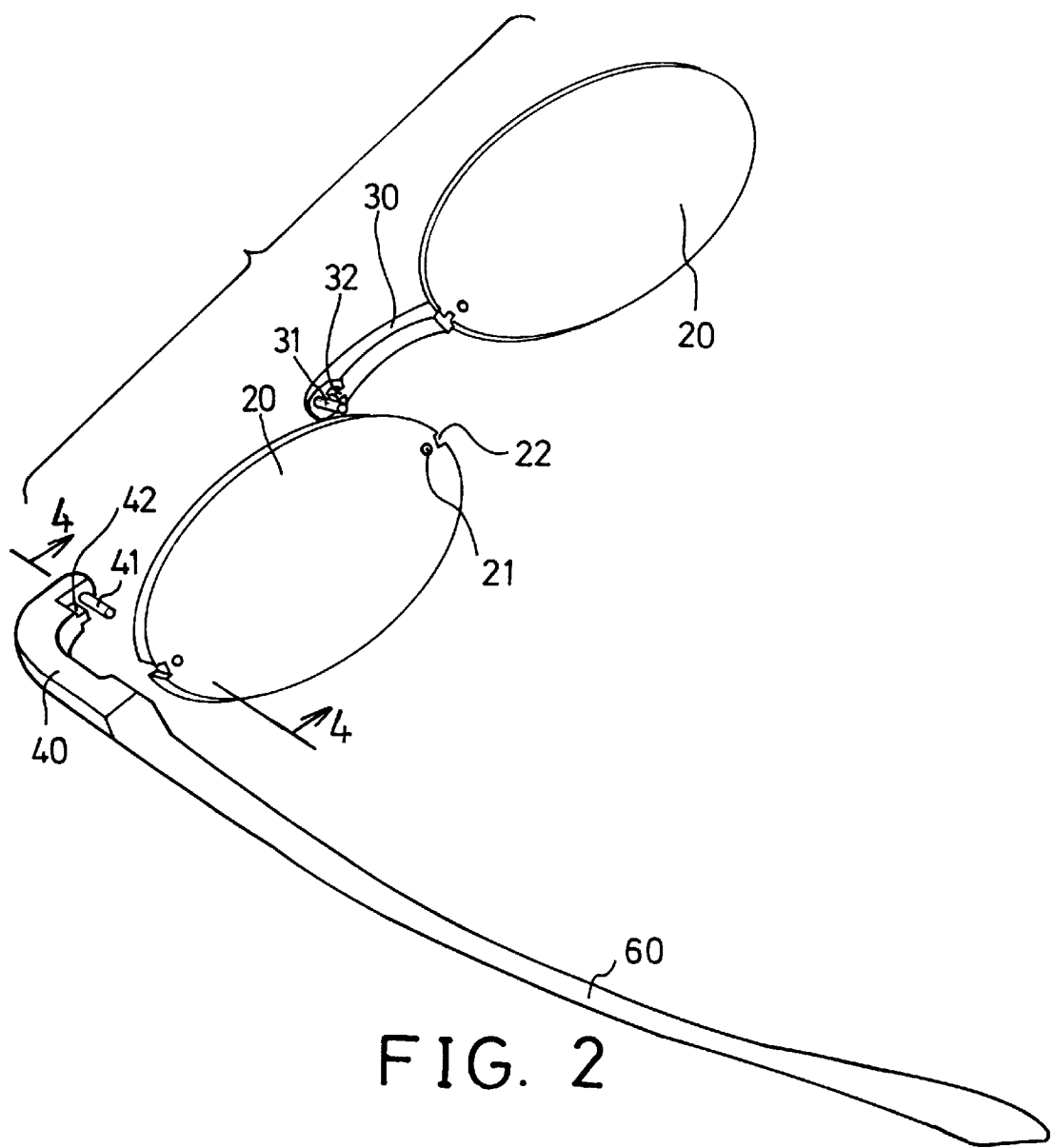
FIG. 2 is a partial exploded view of the spectacle frame.
Figure 3:
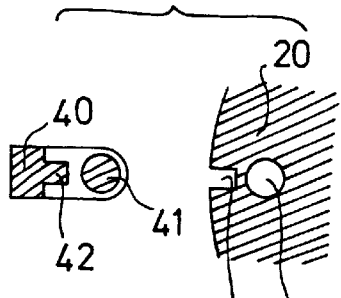
FIG. 3 is a partial plane and exploded view illustrating the corresponding mating portions of the temple and the lens.

Referring to the drawings, and initially to FIGS. 1–5, illustrated is a spectacle frame having spectacle members to be secured together with a method in accordance with the present invention. The spectacle frame comprises a pair of lenses 20, a bridge 30 secured between the lenses 20, and/or a pair of temples 40 secured to the corresponding side portions of the lenses 20 for pivotally supporting respective legs 60 thereto. The lenses 20 each includes one or both sides each having an orifice 21 and an opening 22 formed therein. The opening 22 may include an open side portion as shown in FIGS. 2 and 3, or may include an enclosed or other shape separating from the orifice 21 or communicating with the orifice 21 (FIGS. 6–10) of the lenses 20.

Figure 4:
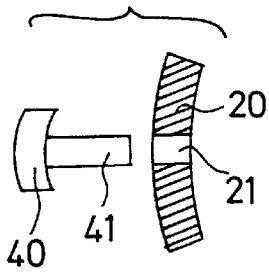
FIG. 4 is a partial cross sectional view taken along lines 4—4 of FIG. 2.
Figure 5:
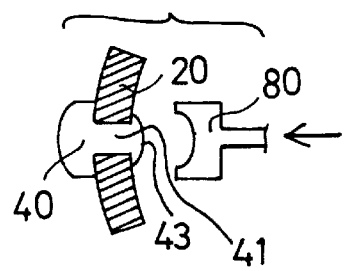
FIG. 5 is a partial cross sectional view taken along lines 5—5 of FIG. 1.
Figure 6:
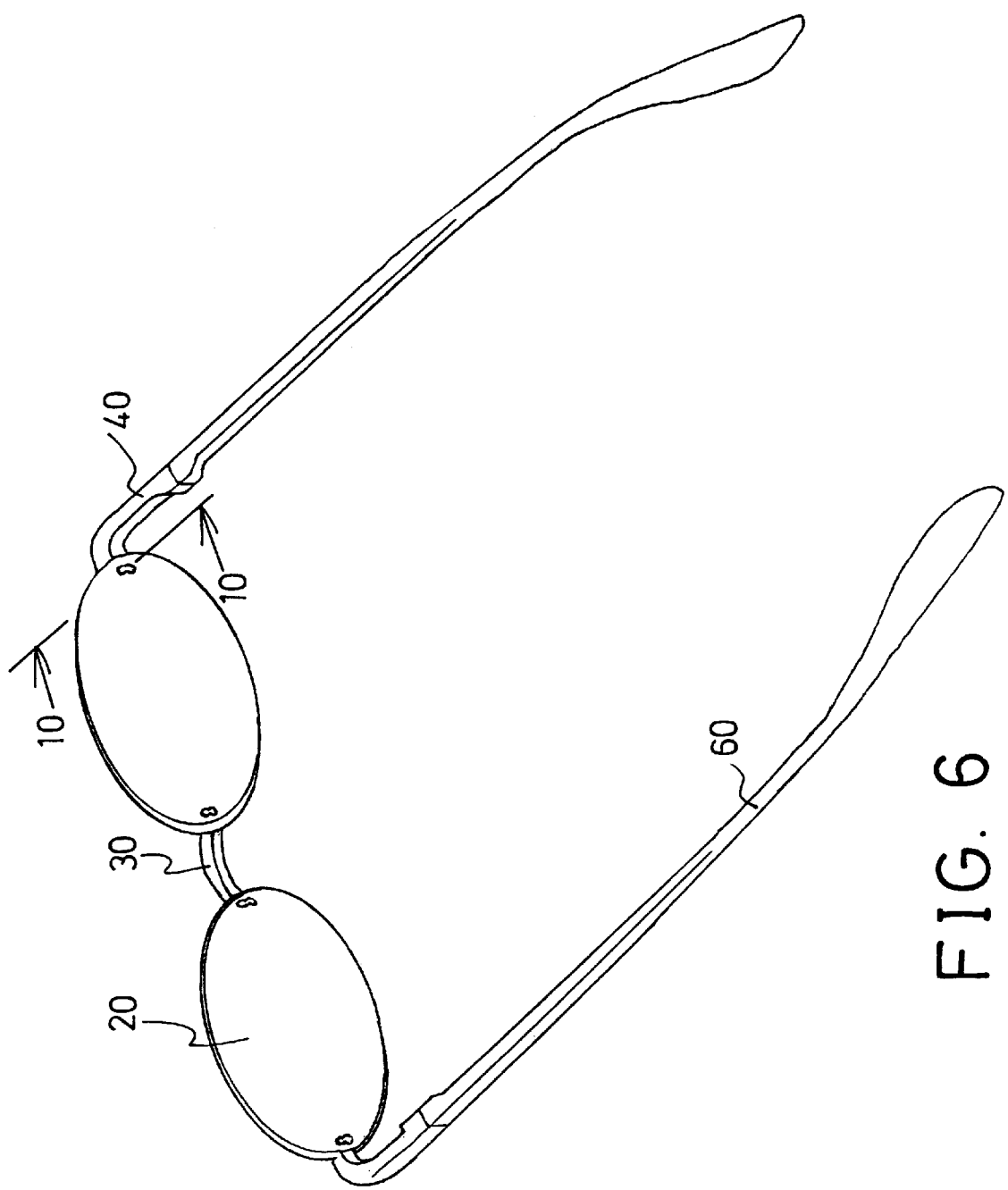
FIG. 6 is a perspective view similar to FIG. 1, illustrating the other application of the spectacle frame.
Figure 7:
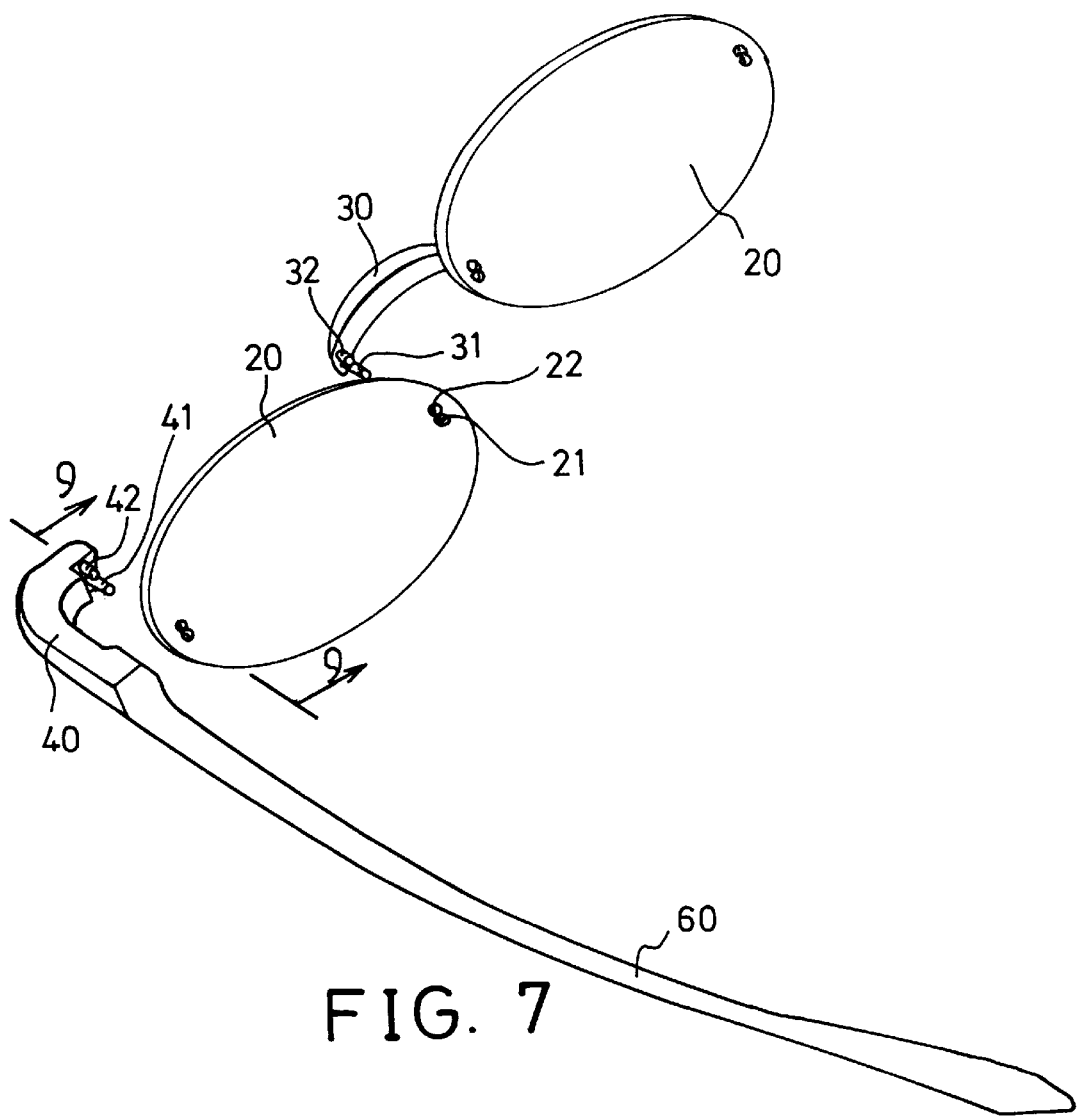
FIG. 7 is a partial exploded view of the spectacle frame as shown in FIG. 6.

The bridge 30 includes two ends each having an extension 31 extended therefrom and engaged through the orifices 21 of the lenses 20, and each having a projection 32 extended therefrom and engaged into the corresponding opening 22 of the lenses 20 (FIGS. 3–5). The temples 40 each also includes an extension 41 extended therefrom and engaged through the orifices 21 of the lenses 20, and a projection 42 extended therefrom and engaged into the corresponding opening 22 of the lenses 20 (FIGS. 6–10). The engagement of the extensions 31, 41 and the projections 32, 42 of the bridge 30 and/or of the temples 40 into the corresponding orifices 21 and the openings 22 of the lenses 20 may prevent the bridge 30 and/or the temples 40 from rotating relative to the lenses 20.

Figures 8, 9, 10:
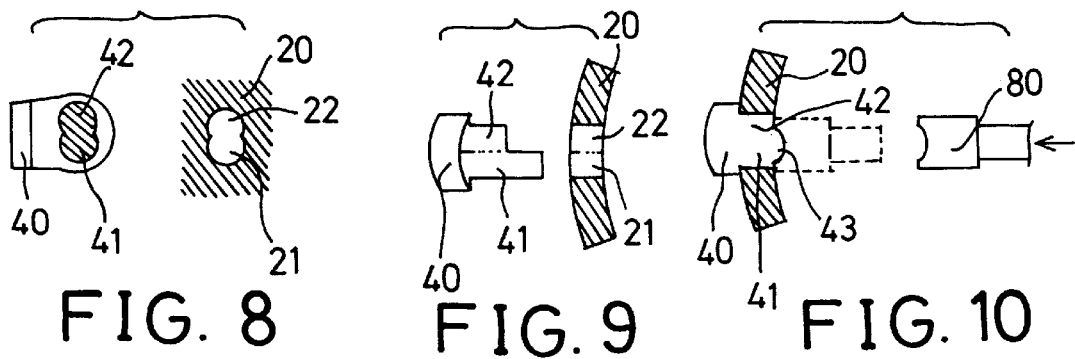
FIG. 8 is a partial plane and exploded view illustrating the corresponding mating portions of the temple and the lens.
FIG. 9 is a partial cross sectional view taken along lines 9—9 of FIG. 7.
FIG. 10 is a partial cross sectional view taken along lines 10—10 of FIG. 6.

As best shown in FIGS. 5 and 10, after the extension 31, 41 of the bridge 30 and/or of the temple 40 is engaged through the orifice 21 of the lenses 20, the tip or the free end of the extension 31, 41 is welded or melted or deformed with a welder device 80 so as to form an enlarged head 43 which may engage with the lenses 20 and may solidly secure the bridge 30 and/or the temples 40 and the lenses 20 together. Alternatively, the projections 32, 42 may be deformed to engage with lenses 20 and to secure the spectacle members 20, 30, 40 together, instead of the deformation of the extensions 31, 41.

The orifices 21 and the openings 22 may be formed in the lenses 20 with a machining or drilling or milling process, or may be formed when the lenses 20 are formed by such as a molding process. The extensions 31, 41 and the projections 32, 42 of the bridge 30 and/or of the temples 40 may be formed while the bridge 30 and/or the temples 40 are formed by such as a molding process, or may be formed separately and engaged into the bridge 30 and/or the temples 40 after the bridge 30 and/or the temples 40 are formed. The spectacle members, including the lenses 20, and the bridge 30, and the temples 40 are preferably made of such as the plastic materials, but not limit to this only, which may be easily molded and melted for allowing the spectacle members to be easily assembled together.

It is to be noted that the spectacle members 20, 30, 40 may be easily and quickly manufactured with a mass production process. In addition, the extensions 31, 41 and the projections 32, 42 of the bridge 30 and/or of the temples 40 may be easily and quickly engaged into the corresponding orifices 21 and the openings 22 of the lenses 20. The free ends of the extension 31, 41 of the bridge 30 and/or of the temple 40 may then be easily and quickly welded or melted with the welder device 80 so as to form the enlarged head 43 and to engage with the lenses 20 such that the spectacle members including the bridge 30 and/or the temples 40 and the lenses 20 may be solidly secured together. The provision and the engagement of the projections 32, 42 of the bridge 30 and/or of the temples 40 into the corresponding openings 22 of the lenses 20 may prevent the bridge 30 and/or the temples 40 from rotating relative to the lenses 20. An adhesive material may further, but not necessarily, be provided for further securing the spectacle members together.

Accordingly, the method in accordance with the present invention may be used for quickly and solidly securing the spectacle members, including the lenses and the temples and/or the bridge, together without fasteners.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A method for securing a first spectacle member and a second spectacle member together, the method comprising:

forming an orifice and an opening in the first spectacle member, forming an extension and a projection on the second spectacle member, engaging the extension and the projection of the second spectacle member into the orifice and the opening of the first spectacle member, and deforming the extension to engage with the first spectacle member and to secure the first and the second spectacle members together.

2. A method for securing a first spectacle member and a second spectacle member together, the method comprising:

forming an orifice and an opening in the first spectacle member, the opening of the first spectacle member including an open structure, forming an extension and a projection on the second spectacle member, engaging the extension and the projection of the second spectacle member into the orifice and the opening of the first spectacle member, and deforming the extension to engage with the first spectacle member and to secure the first and the second spectacle members together.

3. A method for securing a first spectacle member and a second spectacle member together, the method comprising:

forming an orifice and an opening in the first spectacle member, the opening of the first spectacle member including an enclosed structure, forming an extension and a projection on the second spectacle member, engaging the extension and the projection of the second spectacle member into the orifice and the opening of the first spectacle member, and deforming the extension to engage with the first spectacle member and to secure the first and the second spectacle members together.

* * * * *